Nov. 12, 1963  I. T. RATHBUN  3,110,446
LIGHT AIMING DEVICE
Filed Nov. 6, 1961

INVENTOR.
IVAN T. RATHBUN
BY

United States Patent Office 3,110,446
Patented Nov. 12, 1963

3,110,446
LIGHT AIMING DEVICE
Ivan T. Rathbun, 3020 21st St., Columbus, Nebr.
Filed Nov. 6, 1961, Ser. No. 151,592
1 Claim. (Cl. 240—73)

This invention relates to adjustable light holding brackets and more particularly it is an object of this invention to provide a bracket suitable for use on the vertical side of a farm barn to throw light out over the stock yard.

In such uses, the light itself must be so high as to be out of reach so that with an ordinary light-mounted assembly, the light could not be adjusted. It is, therefore, an object of this invention to provide a light aiming bracket for controlling a light which is at a vertical height substantially beyond reach and with which the light can be aimed to any point within a wide horizontal swath and which can be vertically aimed with great selectivity from a remote point such as an operator standing on the ground while the light is fifteen feet or any other desired distance above the ground. Many light-holding assemblies, if they held the light low enough to be reached, would not be holding the light high enough to throw its beam properly.

A particular object is to provide an assembly such that once the light is adjusted, it will hold its position without the attention of the operator, preferably due to inexpensive frictional means which prevents the movement of the parts of the bracket except when such movement is desired to position the light.

I am aware that others have devised light-holding assemblies and for various uses, however, to my knowledge, no one has devised an inexpensive light for this use, and it is an object to achieve this inexpensiveness by means of a simple parallelogram arrangement of parts.

A particular object is to provide a light for this purpose in which unnecessary parts have been eliminated.

A further object is to provide a light having a parallelogram arrangement in which there are upright bars over three times as long as certain generally horizontal bars.

This applicaiton is a continuation in part of the applicant's co-pending patent application Serial No. 6,708, filed February 4, 1960, entitled Light Aiming Device, now abandoned.

Other and further objects and advantages of the present invention will be apparent from the following detailed description, drawings and claim, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

In the drawings:

FIGURE 1 is a side elevational view of the improved light support showing the support mounted on a wall or the like.

FIGURE 2 is a front elevational view of the light support.

FIGURE 3 is a front elevational view of the light support showing the support turned toward one side and also showing the light positioned to project rays of light downwardly.

Figures 1, 2, 3:
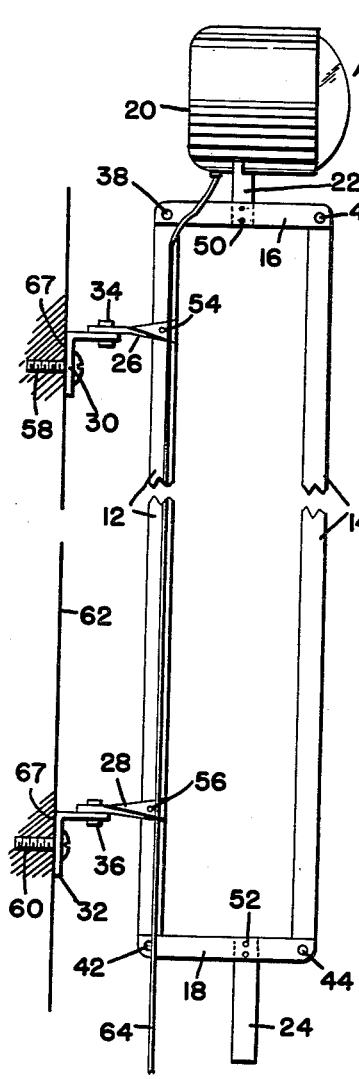
Figure 4:
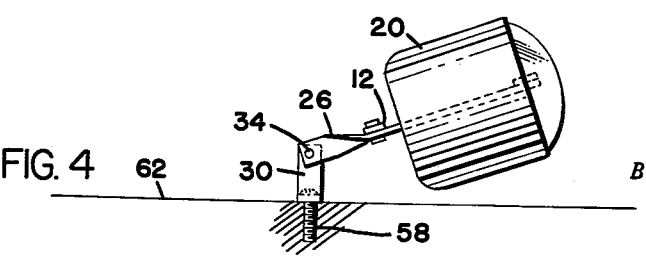
FIGURE 4 is a plan view of the light support with the parts in the positions shown in FIGURE 3.

In the accompanying drawings, and in the following specification, the same reference characters are used to designate the same parts and elements throughout, and in which the numeral 10 refers to the invention in its entirety, numerals 12 and 14 upright or vertical parallel bars, the ends of which are connected by horizontal upper and lower bars 16 and 18, numeral 20 a partially shielded light connected by a strut 22 to the upper bar 16, numeral 24 a handle extended from the lower bar 18, and numerals 26 and 28 arms extended from the vertical bar 12 and pivotally connected to clip angles 30 and 32 by rivets 34 and 36.

The upper bar 16 is connected to upper ends of the vertical bars 12 and 14 by rivets 38 and 40, and the lower bar 18 is pivotally connected by rivets 42 and 44 to lower ends of the bars 12 and 14. It will be seen that the rivets 38, 40, 42 and 44 are sufficiently tight so as to maintain the light in a desired position after adjustment and that this amount of tightness is considerable since the weight of the light 20 exerts considerable leverage on the upper bar 16.

The upper end of the strut 22 is bifurcated providing tabs 46 and 48 which are secured to the light casing by welding or the like. The lower end of the strut 22 is secured to the upper bar 16 by rivets 50. The handle 24 is secured to the lower bar 18 by rivets 52. The arms 26 and 28, which are twisted through an angle of 90 degrees are secured to the bar 12 by rivets 54 and 56.

With the parts assembled as illustrated and described the clip angles 30 and 32 are attached by screws 58 and 60 to a wall surface or frame 62, and an electric cord 64, extended from the light 20, is connected to a suitable source of current supply. By gripping the handle 24, the light may be inclined downwardly, as shown in full lines in FIGURE 3, or upwardly, as indicated by the broken lines 66, as may be desired. The support may also swing in a horizontal plane about the axes of the rivets 34 and 36, turning through substantially 180 degrees. By this means the light may be aimed at substantially any point or area.

Each clip angle 30 and 32 is provided with an outwardly facing surface 67 which latter each lie in a vertical plane for engaging the vertical wall surface 62 which may be the side of a barn.

It will be seen that in the following claim the rivets 38, 40, 42 and 44 form pivotal connection means and that their tightness is a separate means which is actually achieved by having them tight enough to maintain the bracket in its set position by friction.

It will be seen that an important thing is that the pivotal connections 38 and 40 of the upper bar 16 are disposed on a line parallel to the pivotal connection points of the lower bar 18.

The upright bars 12 and 14 are over three times as long as the upper and lower bars 16 and 18, whereby the weight of the light 20 does not render difficult the maintaining of the light in an operating position.

It will be seen that if the reverse were true and the light was far out from the wall 62, the force of the weight of the light would exert great leverage and make it difficult for the light to maintain a vertical position.

It will be seen that the upright bars 12 and 14 together with the horizontal bars 16 and 18 and their pivotal connections together comprise a movable frame to the upper end of which the light is attached.

From the foregoing description, it is thought to be obvious that a light aiming device constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

In a light aiming bracket, the combination which comprises a movable frame comprising: spaced parallel upright bars, an upper bar pivotally connected to upper ends of the upright bars, a lower bar pivotally connected to lower ends of the upright bars; in combination with a light on an upper portion of said frame, arms extended laterally from one of the upright bars, and mounting elements pivotally connected to extended ends of the arms for rotation of said arms about said mounting elements about a vertical axis, said mounting elements each having an outwardly facing vertical surface for engaging a vertical wall of a building, the pivotal connection points of said upper bar being disposed on a line parallel to the pivotal connection points of said lower bar, a partially shielded light mounted on an upper part of said frame, said upright bars being substantially longer than said upper and lower bars for vertical height without excessive horizontal size, and means for resisting pivoting of said arms with respect to said bars with sufficient force so as to maintain said bracket in a desired position of adjustment, said mounting elements being spaced apart vertically a substantial distance for firm support, said upright bars being of a length for disposing said light at such a substantial distance from the lower end of said frame that when that lower end of said frame is barely within a man's reach, said light can be disposed at a vertical height substantially beyond the man's reach whereby a remote control of said light is made possible for directing said light through a wide horizontal swath and providing remote selective vertical aiming.

References Cited in the file of this patent

UNITED STATES PATENTS

| | | |
|---|---|---|
| 1,255,185 | Lehmkuhl | Feb. 5, 1918 |
| 2,833,504 | Sacksteder | May 6, 1958 |
| 2,911,525 | Strom | Nov. 3, 1959 |

FOREIGN PATENTS

| | | |
|---|---|---|
| 152,275 | Australia | July 10, 1953 |
| 950,485 | Germany | Oct. 11, 1956 |